US006466155B2

(12) United States Patent
Taylor et al.

(10) Patent No.: US 6,466,155 B2
(45) Date of Patent: Oct. 15, 2002

(54) METHOD AND APPARATUS FOR DETECTING A MOVING OBJECT THROUGH A BARRIER

(75) Inventors: David W. A. Taylor, Greensboro, NC (US); William Todd Faulkner, Cullowhee, NC (US)

(73) Assignee: ENSCO, Inc., Springfield, VA (US)

( * ) Notice: Subject to any disclaimer, the term of this patent is extended or adjusted under 35 U.S.C. 154(b) by 0 days.

(21) Appl. No.: 09/821,092

(22) Filed: Mar. 30, 2001

(65) Prior Publication Data

US 2002/0140597 A1 Oct. 3, 2002

(51) Int. Cl.⁷ .............................................. G01S 13/00
(52) U.S. Cl. ............................ 342/22; 342/28; 342/159
(58) Field of Search .......................... 342/22, 28, 159, 342/162

(56) References Cited

U.S. PATENT DOCUMENTS

| | | | |
|---|---|---|---|
| 3,755,812 A | | 8/1973 | Bechtel et al. |
| 3,787,840 A | | 1/1974 | Dotson |
| 3,905,031 A | | 9/1975 | McCord |
| 4,210,912 A | * | 7/1980 | Naidich et al. ............... 343/7.7 |
| 4,608,566 A | * | 8/1986 | Ennis et al. .................... 343/5 |
| 4,675,677 A | * | 6/1987 | von Maydell et al. ........ 342/25 |
| 4,855,747 A | | 8/1989 | Steinberg |
| 5,122,803 A | | 6/1992 | Stann et al. |
| 5,150,426 A | * | 9/1992 | Banh et al. .................... 382/48 |
| 5,345,240 A | * | 9/1994 | Frazier ......................... 342/28 |
| 5,446,461 A | | 8/1995 | Frazier |
| 5,644,508 A | * | 7/1997 | McNary et al. ............. 364/516 |
| 5,905,455 A | * | 5/1999 | Heger et al. .................. 342/22 |
| 5,959,566 A | | 9/1999 | Petty |
| 6,100,839 A | * | 8/2000 | Heger et al. .................. 342/22 |
| 6,313,643 B1 | * | 11/2001 | Tirkel et al. ................. 324/642 |

* cited by examiner

Primary Examiner—Thomas H. Tarcza
Assistant Examiner—Brian Andrea
(74) Attorney, Agent, or Firm—Nixon Peabody LLP; Jeffrey L. Costellia

(57) ABSTRACT

The method and apparatus for detecting a moving object through a barrier uses radar imaging and a multiplicity of spatially separated antennas to acquire full-waveform radar data that accurately represents the measurement of the propagating wavefield. The data is enhanced by subtracting an estimate of previously recorded background data, and beamforming of the enhanced data is performed to compute an image from the data provided on multiple channels.

19 Claims, 2 Drawing Sheets

FIG. 1
FIG. 2
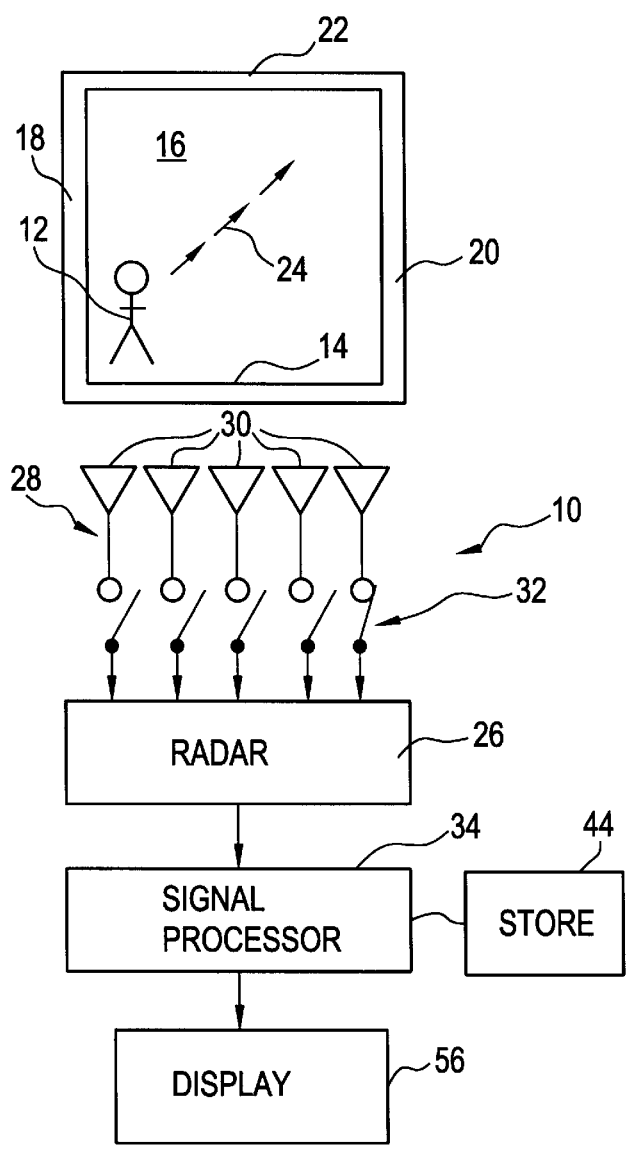
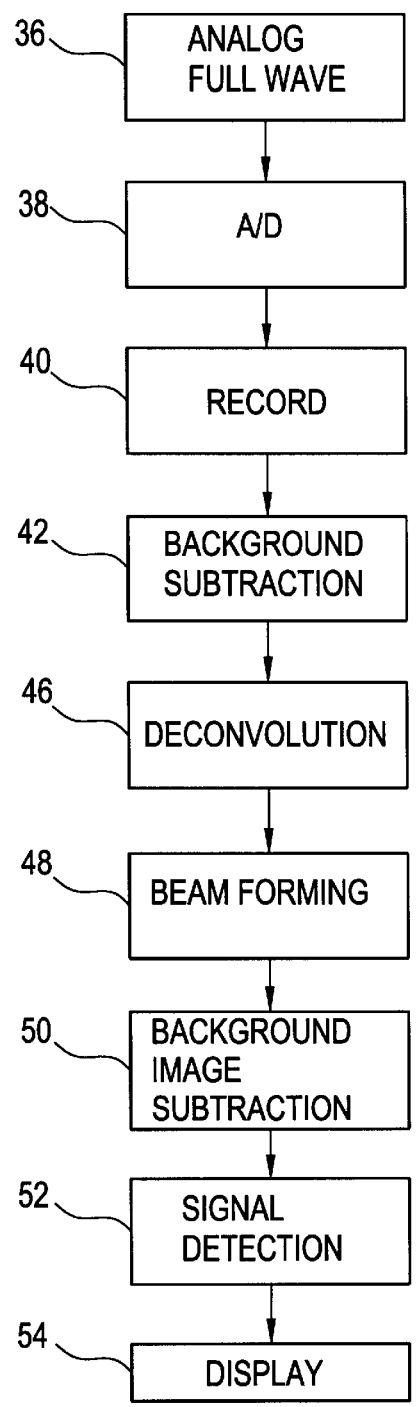

METHOD AND APPARATUS FOR DETECTING A MOVING OBJECT THROUGH A BARRIER

BACKGROUND OF THE INVENTION

Many commonly used motion detectors, such as those used to activate security outdoor lighting or indoor burglar alarms, detect only motion not obstructed by an intervening barrier. Also, these detectors respond only to motion, and do not track or provide the location of the object whose movement is sensed.

For certain applications, including but not limited to law enforcement, and fire and rescue, it is desirable to provide a portable, battery powered, apparatus capable of detecting a moving object through a barrier such as the wall of a closed room. To this end, motion detecting radar units have been developed which rely on a single radar transmitter and a single radar receiver to detect a moving object. Such devices suffer a number of deficiencies when employed to detect moving objects behind a barrier, such as the wall of a closed room. Although motion may be detected, the location of the moving object may remain a mystery.

U.S. Pat. No. 5,446,461 to Frazier discloses an imaging radar system having an antenna array for generating images of moving targets behind an obscuring structure. The data provided by this radar system is subject to background clutter which may result from internal walls and stationary objects present in an enclosed space.

Also, U.S. Pat. No. 5,345,240 to Frazier discloses a handheld motion detecting radar unit.

SUMMARY OF THE INVENTION

It is a primary object of the present invention to provide a novel and improved method and apparatus for detecting a moving object wherein motion of an object is mapped to provide the distance and bearing to the object.

Another object of the present invention is to provide a novel and improved method and apparatus for detecting a moving object using a radar system and antenna array for full waveform data acquisition and then accomplishing beam forming by combining the data from multiple transmitter/receiver combinations.

A further object of the present invention is to provide a novel and improved method and apparatus for detecting a moving object through a barrier wherein negative background influences are removed from data provided by a radar system and antenna array.

A still further object of the present invention is to provide a novel and improved method and apparatus for detecting a moving object through a barrier using a radar system and antenna array for full waveform data acquisition and then removing background influences from the acquired data before accomplishing beamforming.

These and other objects of the present invention are achieved by providing a novel and improved method and apparatus for detecting a moving object either directly with no intervening barrier or through a barrier by means of a radar system which acquires digital radar data using spatially separated antennas. These may constitute multiple transmitting antennas, multiple receiving antennas or multiple antenna transmitting and receiving (TR) pairs. The radar system must be one which provides full waveform radar data such that the data accurately represents the measurement of the propagating wavefield. Background data, which has been previously measured, is subtracted to enhance the received data. The data may be further enhanced by deconvolution which removes an estimate of the impulse response of the system, and then beamforming of the enhanced data is performed to compute an image. Finally, signal detection can be performed to identify and report the location of a detected object.

BRIEF DESCRIPTION OF THE DRAWINGS

FIG. 1 is a block diagram showing the apparatus for detecting a moving object of the present invention;

FIG. 2 is a flow diagram showing the method performed by the apparatus of FIG. 1.

DESCRIPTION OF THE PREFERRED EMBODIMENTS

Figure 3:
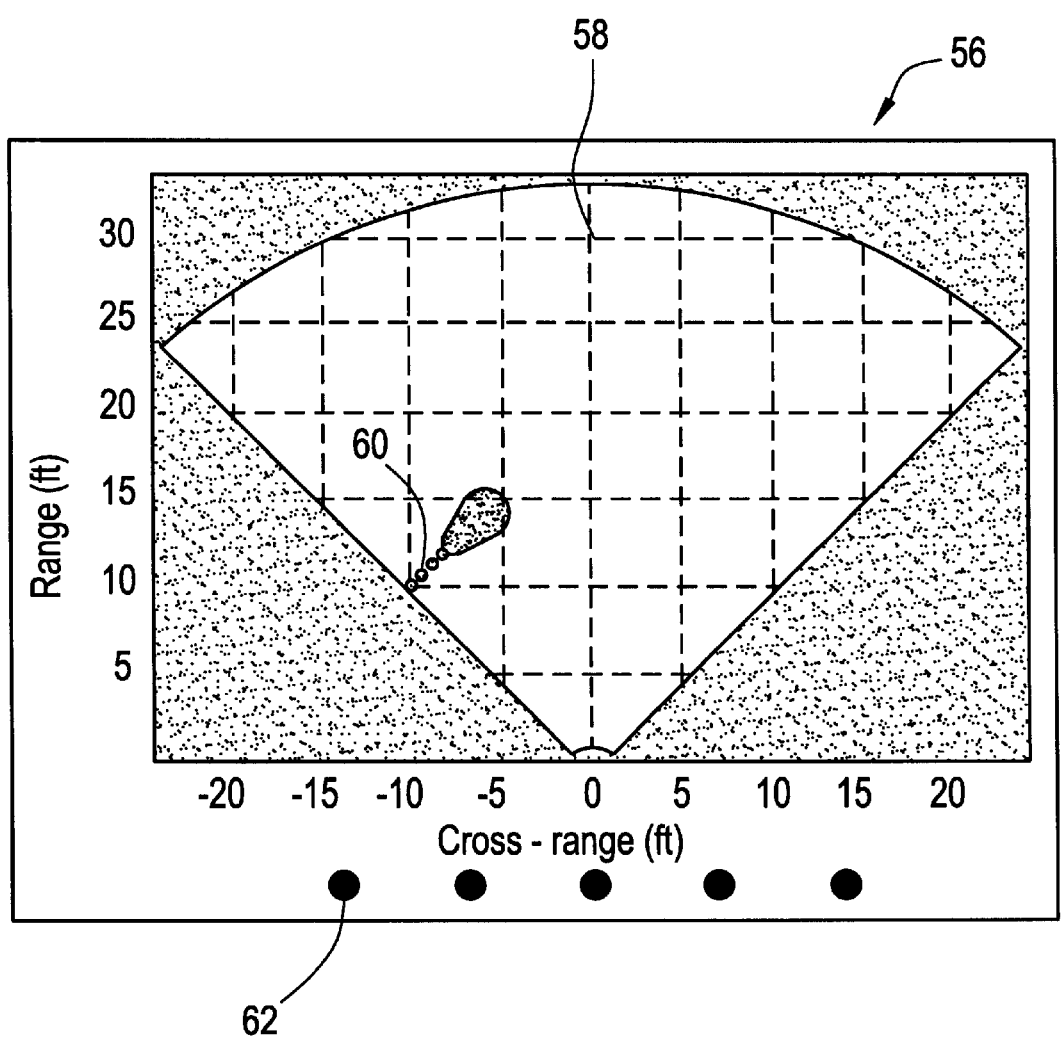
FIG. 3 is a view in front elevation of the display unit of FIG. 1.

The system for detecting a moving object of the present invention indicated generally at 10 provides the capability to detect, locate and track a moving object 12, such as a person or animal, either directly or through a closed wall or door 14. The closed wall or door may constitute a portion of a room 16 having sidewalls 18 and 20 and a back wall 22 within which the object is moving as indicated by the arrows 24.

The system 10 includes a motion detecting radar unit 26 capable of providing full waveform data. Most ground penetrating radar systems previously developed do acquire full waveform data, and a number of conventional radar units can be used for the radar unit 26. Specifically, impulse radar systems, such as the ground penetrating systems made by Sensors & Software, Inc. (for example, the pulse EKKO 1000) or Geophysical Survey Systems, Inc. (for example, the SIR-2000) are viable candidate radar systems for use as the radar unit 26.

To map the location of motion sensed through the barrier 14, the radar unit 26 is connected to a linear array of monostatic radar antenna pairs 28 where the transmitting and receiving antennas 30 are co-located. Alternatively, a single transmitting antenna could be employed with multiple receiving antennas or multiple transmitting antennas could be employed with a single receiving antenna. Any of these antenna arrays can be used with a single radar unit 26 as shown in FIG. 1 having a switching system 32 for sequentially switching between antenna pairs. Also, multiple radar systems, one for each antenna pair, can be used.

The three dimensional geometry of imaged objects can be measured using two-dimensional arrays 28. Any two dimensional spatially separated configuration of transmitting and/or receiving antennas has the potential to provide the spatial variability needed to map motion in three dimensions. A box shaped array configuration comprised two or more separate arrays 28 is a possibility for obtaining measurement of the three dimensional geometry of an imaged target.

Although the size of the linear array 28 may vary, it has been found that a linear array having approximately a 12–15 inch width with the monostatic antenna pairs 30 equally separated on-center by approximately 3 inches provides effective mapping through a door or wall through a range of approximately thirty feet.

The full waveform analog signal detected by the radar unit 26 from each antenna pair 30 is processed in a signal processor 34 as indicated in FIG. 2. For the sophisticated signal processing which is required with multi-channel radar systems to accomplish beamforming to combine the measurements from multiple transmitter/receiver combinations 30, full waveform data that accurately provides a digital representation of the measured wavefield is required. Thus, the full waveform analog data signals received from each antenna pair at 36 are digitized at 38. This data must be sampled by the radar unit 26 so that the highest frequency of interest is adequately sampled. This is the equivalent to saying that the digitizing Nyquist frequency is greater than the highest frequency contained in the analog signal measured by the receiving antenna.

As an example, with an effective bandwidth of 1 to 3 gigahertz (GHz), a sampling interval of approximately 61 picoseconds (ps), yields a Nyquist frequency of approximately 8 GHz. It is our experience that slightly over sampling to provide a minimum of four samples per cycle at the highest frequency is preferable to the theoretical Nyquist limit of two samples per cycle at the highest frequency.

As the digitized full waveform data is received that accurately represents the measurement of the propagating wavefield, this data is recorded at 40, and at 42, the recorded data is enhanced by subtracting an estimate of previously measured background data. This step is directed toward improving and simplifying data quality by removing the negative influences of three effects: 1) reflections and other scattered responses from objects within the room, 2) reflections and other scattered responses from objects and structures close to the antenna (the door/wall/etc.), and 3) system effects related to bias and near-field phenomena.

These effects are removed by estimating the response at a specific antenna location. This estimate is a time series for each transmit/receive pair 30. For future data, this estimate of the background is stored at 44 and subsequently removed by subtraction:

$$\text{time\_series}_{improved} = \text{time\_series}_{measured} - \text{time\_series}_{background}.$$

One aspect of the measured data that one may wish to remove is a constant bias. Bias can be removed separately or as part of the background, as appropriate.

The easiest way to determine the background time series is to make a direct measurement through the barrier 14 when there is no moving target. This is not always possible, so there are several options for estimating the background in an operational scenario. It is possible to: 1) Measure a sequence of candidate background time series' over a period of time. Evaluate the statistical similarity of these candidates. Use statistical methods to determine the best estimate of background for each transmit/receive pair. Use this time series as the estimate of background. 2) Acquire an initial measurement of the response from each transmit/receive pair 30. Update the estimate sequentially over a period of time with weighted estimates of current estimates. This will allow the effect of any potential moving target to be removed and it will allow a time-variable estimate of the background.

Other approaches for estimating and removing background data may be equally viable.

Once the recorded data is enhanced by subtracting the background data at 42, deconvolution may be achieved at 46 by removing an estimate of the impulse response of the radar system so that effective impulse response after processing is optimally short. Radar systems are never spectrally white, nor have linear (or minimum) phase responses. Complications in the amplitude and phase response are due to analog filters on the transmit side, transmit antenna response, receive antenna response, receive circuit filters, plus imperfections in the driving function. The practical implication of these amplitude and phase complications is that the impulse response of the system in the time domain is lengthened. For a multi-channel imaging system, such length leads to ambiguity in the location of the imaged target.

The estimate of the impulse response could be acquired in a variety of ways. It could be estimated theoretically from the known electronic components. It could be estimated by making an empirical estimate of the far-field response of a simple reflector. For example, data could be acquired for a reflection from a planar metallic target at about 6-ft distance from the antennas. This data can then be windowed and tapered around the reflection signal and used as the impulse response.

Deconvolution can be computed in a variety of mathematically equivalent ways. Computation is usually quicker in the frequency domain following these steps: i) compute the Fourier transform of a data channel, ii) compute the Fourier transform of the impulse response estimate, iii) compute the complex ratio of the data transform to the impulse response transform, and iv) compute the inverse Fourier transform of the ratio. Proper use of windowing, tapers, and zero-filling need to be observed. Computation can also be accomplished in the time domain.

Deconvolution is a highly desirable and effective tool. However, a lesser performing system can be implemented by omitting the deconvolution step between background data subtraction and beamforming.

At 48, beamforming is accomplished to combine the measurements from the multiple transmitter/receiver combinations 30. Data collected using an antenna array radar system will consist of signals scattered from objects within the area of interest and of both ambient and system noise. Reflections from an object will be recorded at times that correspond to the two-way travel time from the transmitter to the object and back to the receiver and will appear as a diffraction hyperbola in a spatial plot of the raw data. Beamforming, or migrating, the data generates an image of the object reflectivity, which shows the location and relative amplitude of reflected energy for each object. This process is also called synthetic aperture radar (SAR) processing in some literature.

Beamforming is based on the summation of amplitudes along hyperbolic paths to essentially collapse all of the diffraction hyperbolas. The first step in beamforming is to construct a spatial grid. Then, for each point on the grid, compute the two-way travel time from each transmitter to the grid point and back to the corresponding receiver and sum the amplitudes corresponding to these times for the data measured at each transmit/receive antenna pair 30. Assuming the measured data is coherent, beamforming significantly improves the signal-to-noise ratio because of the constructive interference that occurs when the amplitudes along the hyperbolic path have the same phase.

There are a few things to consider when designing the spatial grid. First, the grid spacing in each dimension must be small enough such that beamforming takes advantage of constructive interference. In the simplest case, a two dimensional planar equally-spaced grid can be constructed, but there is no inherent restriction on using an unequally-spaced or three-dimensional grid. Beamforming on a two-dimensional radial grid is more computationally efficient and provides good results in the subject invention.

At a certain range that can be compared based on the distance between antenna locations in the array and sampling frequency, the actual data that most closely fit the computed hyperbolic path lies in a straight line. At ranges greater than or equal to this range, the data indices associated with the two-way travel times for all of the transmit/ receive pairs simply increase by a constant and we no longer have to compute the two-way times. This reduces computation time.

The processing step described above at 42 for background removal is applied to measured time series data. After beamforming, we have an image. An alternative to subtraction of the background data would be to compute a background image, which is used to subtract from a current data image at 50. While either or both methods of background subtraction could be applied, we prefer to subtract background time series' prior to beamforming.

Moving objects will appear as anomalous amplitudes in the image that results from beamforming. At this point, the image could simply be displayed, and users could be trained to visually analyze the data and detect moving targets. In some applications, a more user-friendly system that uses a signal detection step at 52 to detect and accurately locate moving objects is desirable. A simple signal detection algorithm computes the power and mean and standard deviation of the power on each data point in the image and reports a detection when the power level exceeds some threshold, which is usually a function of the standard deviation.

The signal detection algorithm implemented during development of this invention computes a series consisting of the energy in short windows for each radial beam. Then, the largest four values of the short-term average energy on all traces are excluded before computing the long-term average energy on each trace. A mean and standard deviation for the long-term average energy for all traces is computed. For each data-point, the threshold is defined by a scale factor times the standard deviation, where the scale factor is a function of the range and cross-range of the point. A detection's location is reported when the energy level exceeds this threshold.

It is often necessary to refine the detections that will be reported for display. Multiple detections may be located at adjacent locations. The detection with the larger amplitude is usually retained and the smaller amplitude adjacent detections are considered redundant and are deleted. Commonly, detections will be recorded immediately behind a detected moving object. Because the object closer to the radar equipment will shadow or shield the more distant object, we remove these more distant objects for the reported output. However, as will be discussed below, these "shadowed" detections yield important information about fixed objects within the room.

The processed data is next displayed at 54 by transmittal from the signal processor 34 to a display unit 56. This display unit, as shown by FIG. 3, provides a motion map 58, shaped like a pie slice, that contains a trail of red dots 60 at locations where activity was detected. This display indicates the location of moving objects in a two-dimensional slice in front of a linear array of radar antennas. The horizontal axis (labeled "Cross-range (ft)" is the linear dimension in the direction of the linear antenna array. The vertical dimension (labeled "Range (ft)") is the perpendicular distance from the antenna array. The center of the antenna array is located at a range and cross-range of zero, which is the bottom center of the display.

The motion map is pie-shaped because the transmitting and receiving antennas have limited response patterns in the lateral dimension. Thus, it is only reasonable to compute an image and detect motion in ranges where the antenna response is significant. The dots show the location of detected motion. They are initially a bright color but fade to black and decrease in size as time advances. We prefer that this map be updated rapidly, on the order of 5 times per second, so that the effect of a person walking across a room is displayed as a trail across the display.

The buttons 62 on the bottom of the screen correspond to each of the elements in the antenna array and are data quality indicators (in this case, we have shown five, for a five-antenna device). Each button, which may be initially green, remains green until the corresponding antenna receives a poor signal because of decoupling or blockage when it turns red.

Data collected using an antenna array radar system (such as described above) will yield measurements that include signals scattered from objects within the room. Consider a law enforcement scenario where an array antenna radar device is held against a door. When no person or moving object is in the room, the largest measured signal is usually the reflection from the back wall 22 of the room 16. This data, among other effects, will be contained in the background data.

Next, if a person or moving object 12 enters the room, the data will be different. Removing the background data via subtraction (either by subtracting time series data or by subtracting images) gives the difference in the two circumstances (someone being in the room or not). This produces two effects in the data. First we get a reflection from the newly introduced object (the person, for example). This is the primary target we want to detect and display the location of using the previously described process flow.

The second effect is that the person or moving object 12 will "shadow" reflectors behind it. Consider an empty room. In the background data, the reflection scattering off the rear wall 22 will be included in the data. When the person is in the room, the scattering location on the rear wall that is on-line between the antenna and the person will receive much less energy. Thus, in the final processed data, this rear wall reflection will prominently appear since it does not exist in both the background and current data sets.

This shadowing phenomenon can be used to map the location of objects in the room. If a moving target such as a person walks across a room, the moving target will essentially "paint" an image of reflectors in the room that are located behind the moving targets. Thus, this method provides a means to determine the room size and location of fixed objects when a moving target is present.

We claim:

1. A method for detecting a moving object through a barrier with a radar system which includes:
    transmitting and/or receiving radar signals through said barrier using a multiple radar antenna array to form a plurality of separate channels;
    acquiring full waveform radar data signals through said barrier on each said channel, each of the acquired full waveform radar data signals providing a representation of a measured wave field; and
    beamforming the full waveform radar data signals to combine the radar data signals from said plurality of channels to provide one or more detected images.

2. The method of claim 1 which includes using a multiple antenna array formed by a plurality of spaced, co-located transmitting and receiving radar antenna pairs.

3. The method of claim 1 which includes sequentially switching between said plurality of separate channels to sequentially acquire full waveform radar data signals from each channel.

4. The method of claim 1 which includes acquiring prior to acquiring said full waveform data signals background data signals indicative of background conditions which will have a negative influence on full waveform data signals to be acquired on each such channel and enhancing said acquired full waveform data signals from each channel by removing therefrom previously acquired background data signals.

5. The method of claim 4 which includes displaying one or more of the images provided by beamforming.

6. The method of claim 4 which includes acquiring said background data signals by transmitting and/or receiving radar signals through said barrier using the multiple antenna array with no moving object present.

7. The method of claim 6 which includes sequentially switching between said plurality of separate channels to acquire said background data signals and subsequently sequentially switching between said plurality of separate channels to acquire full waveform radar data signals from each channel.

8. A method for detecting a moving object through a barrier with a radar system which includes:

transmitting and/or receiving radar signals through said barrier using a multiple radar antenna array to form a plurality of separate channels;

acquiring full waveform radar data signals through said barrier on each said channel;

beamforming the full waveform radar data signals to combine the radar data signals from said plurality of channels to provide one or more detected images; and deconvolving the full waveform radar data signals prior to beamforming by developing prior to acquiring said full waveform radar data signals an estimate of the impulse response in the time domain for the radar system and using such estimate of the impulse response to correct said full waveform radar data signals.

9. The method of claim 8 which includes displaying one or more of the images provided by beamforming.

10. The method of claim 8 which includes acquiring prior to acquiring said full waveform data signals background data signals indicative of background conditions which will have a negative influence on full waveform data signals to be acquired on each such channel and enhancing said acquired full waveform data signals from each channel by removing therefrom previously acquired background data signals.

11. The method of claim 10 which includes acquiring said background data signals by transmitting and/or receiving radar signals through said barrier using the multiple antenna array with no moving object present.

12. The method of claim 11 which includes sequentially switching between said plurality of separate channels to acquire said background data signals and subsequently sequentially switching between said plurality of separate channels to acquire full waveform radar data signals from each channel.

13. The method of claim 5 which includes deleting redundant detected images resulting from beamforming when multiple detected images occur.

14. The method of claim 13 which includes computing the power level of the radar data signals forming each detected image and deleting images from the display having a power level below a threshold value.

15. A method for detecting a moving object through a barrier with a radar system which includes:

transmitting and/or receiving radar signals through said barrier using a multiple radar antenna array to form a plurality of separate channels;

acquiring full waveform radar data signals through said barrier on each said channel, each of the acquired full waveform radar data signals providing a representation of a measured wave field;

beamforming the full waveform radar data signals to combine the radar data signals from said plurality of channels to provide one or more detected images;

acquiring prior to acquiring said full waveform data signals background data signals indicative of background conditions which will have a negative influence on full waveform data signals to be acquired on each such channel;

enhancing said acquired full waveform data signals from each channel by removing therefrom previously acquired background data signals;

displaying one or more of the images provided by beamforming;

deleting redundant detected images resulting from beamforming when multiple detected images occur;

computing the power level of the radar data signals forming each detected image and deleting images from the display having a power level below a threshold value; and deconvolving the full waveform radar data signals prior to beamforming by developing prior to acquiring said full waveform radar data signals an estimate of the impulse response in the time domain for the radar system and using such estimate of the impulse response to correct said full waveform radar data signals.

16. The method of claim 15 which includes developing said background data signals by transmitting and/or receiving radar signals through said barrier using the multiple antenna array with no moving object present.

17. The method of claim 16 which includes sequentially switching between said plurality of separate channels to sequentially acquire full waveform radar data signals from each channel.

18. The method of claim 17 which includes sequentially switching between said plurality of separate channels to acquire said background data signals and subsequently sequentially switching between said plurality of separate channels to acquire full waveform radar data signals from each channel.

19. The method of claim 18 which includes using a multiple antenna array formed by a plurality of spaced, co-located transmitting and receiving radar antenna pairs.

* * * * *